United States Patent [19]

Hendrick

[11] Patent Number: 5,054,521
[45] Date of Patent: Oct. 8, 1991

[54] MULTIPLE ORIFICE VALVE WITH IMPROVED TURN-DOWN RATIO

[75] Inventor: Fred W. Hendrick, Cerritos, Calif.

[73] Assignee: Automatic Control Components, Inc., Denver, Colo.

[21] Appl. No.: 537,259

[22] Filed: Jun. 13, 1990

[51] Int. Cl.$^5$ .................... F16K 47/04; F16K 3/08
[52] U.S. Cl. ....................... 137/625.31; 137/625.3; 251/208
[58] Field of Search ............ 137/625.31, 625.3; 251/208

[56] References Cited

U.S. PATENT DOCUMENTS

| | | | |
|---|---|---|---|
| 3,207,181 | 9/1965 | Willis . | |
| 4,098,294 | 7/1978 | Woods | 137/625.31 X |
| 4,360,040 | 11/1982 | Cove et al. | 137/625.31 X |
| 4,603,834 | 8/1986 | Hendrick | 137/625.31 X |
| 4,901,977 | 2/1990 | Hendrick . | |
| 4,903,725 | 2/1990 | Ko | 137/625.31 X |
| 4,922,950 | 5/1990 | Taylor | 137/625.31 X |
| 4,946,134 | 8/1990 | Orlandi | 137/625.31 X |

*Primary Examiner*—Arnold Rosenthal
*Attorney, Agent, or Firm*—Clifford A. Poff

[57] ABSTRACT

To improve the turn-down ratio and reduce the erosiveness of the discharge flow in a multiple orifice valve having a movable upstream disk and an abutting stationary downstream disk, particularly when the disks are subjected to high fluid pressures, the disks are provided with cooperating fluid conducting openings having a modified circular sector shape. In the preferred embodiment, the modified circular sector shape of the fluid conducting openings includes a primary opening portion formed in the general shape of a circular sector and a secondary opening portion comprising a pair of substantially semicircular supplemental openings, one of the pair of openings being provided at a radially outermost location along a first one of two radially directed walls defining therebetween the central angle of the circular sector shaped primary opening portion, the other of the pair of supplemental openings being provided at a similar location along the second one of the two radially directed walls. The semicircular supplemental openings, when properly aligned to an optimum turn-down position, provide a significantly increased turn-down ratio and low-erosion discharge flow thorugh the downstream disk which is essentially always parallel with a central plane bisecting the fluid conducting openings of the downstream disk and passing through a common central axis of the disks.

9 Claims, 3 Drawing Sheets

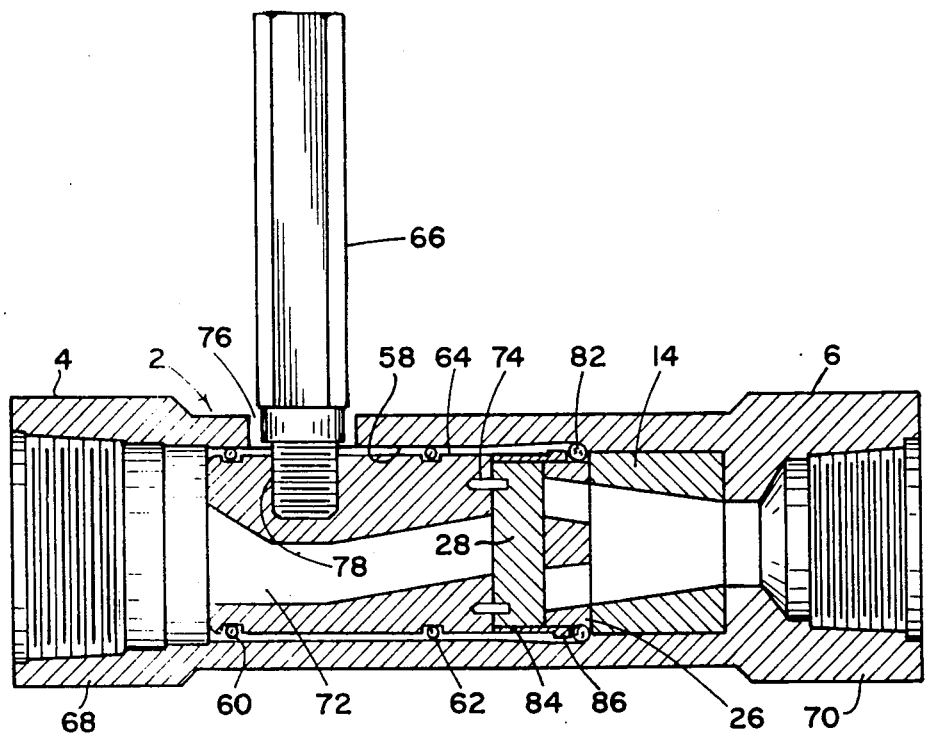
FIG. 2
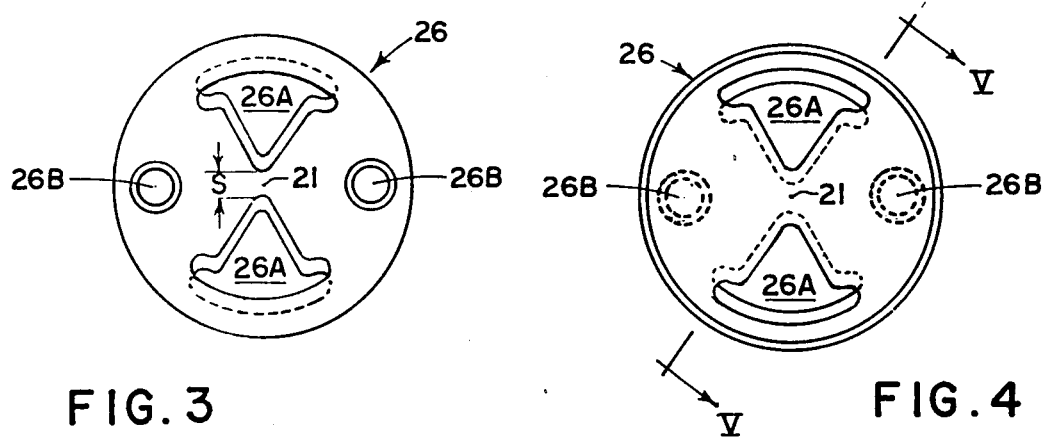
FIG. 3
FIG. 4
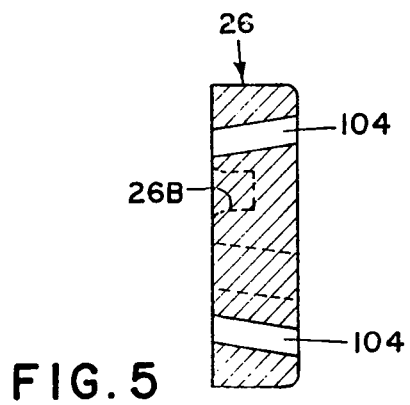
FIG. 5
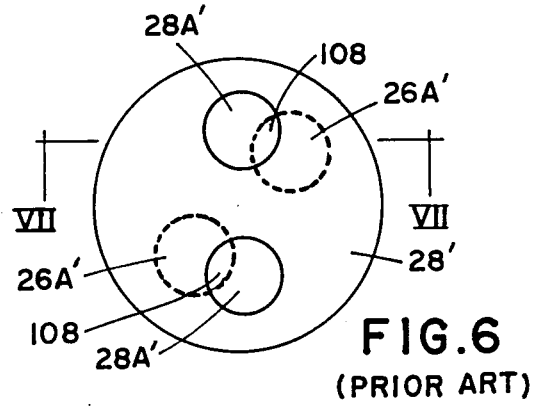
FIG. 6
(PRIOR ART)

MULTIPLE ORIFICE VALVE WITH IMPROVED TURN-DOWN RATIO

BACKGROUND OF THE INVENTION

1. Field of the Invention

The present invention relates generally to a valve having relatively movable disk members each with at least one fluid opening which can be brought into and out of fluid conducting alignment for discharging fluid to a discharge port, and, more particularly, to improvements to such a valve which include disk members having fluid openings of a particular shape for increasing the valve turn-down ratio and flow capacity and for reducing fluid erosion in the valve especially when the valve is subjected to high fluid pressures.

2. Description of the Prior Art

This invention relates to a valve of the type having a stationary disk and a rotatable disk mounted in a valve housing in a face-to-face confronting relationship in a pathway for fluid ia valve body. The disks are each provided with at least one orifice or opening which controls the flow of fluid through the valve by the size of the openings in the disk as well as the degree of alignment between the openings in the disk. Angular movement of one disk relative to the other in the valve body is usually accomplished by moving or turning a handle situated outside of the valve body but coupled to produce rotation of the rotatable disk. The rotatable disk can be moved from a full open position wherein the opening or openings in one disk completely align with the opening or openings in the other disk for providing maximum flow through the valve to a fully closed position wherein the opening or openings in the respective disks are completely misaligned and blocked by solid portions of the confronting disks. Examples of valves which operate in this fashion are disclosed in my prior U.S. Pat. No. and 4,901,977 and in my copending U.S. patent applications Ser. Nos. 450,549 and 417,064, the disclosures of which are incorporated herein by reference.

Valves of this type are particularly useful for controlling the flow of fluids from oil and gas wells and the like. Such a valve is sometimes called a choke when used to control the rate of flow of well production fluids that may contain abrasive contaminants such as sand particles. The fluid entering the valve may be under extreme pressure of the order of, for example, 3000 PSI. The openings in the disks are of a smaller cross-sectional area than either an upstream entry chamber or a downstream discharge chamber that are formed in a valve body. The openings in the disks cause an acceleration of the fluid passing through the openings in the disk. Therefore, the fluid emerging from the opening in the downstream disk enters a discharge chamber at an increased velocity which has a cross-sectional area that is greater than the cross-sectional area of the openings in the disk, but because of the construction of the discharge chamber, particularly when provided with a replaceable protective sleeve or insert in the valve body, a large pressure drop in the fluid passing through the sleeve is created. The effect is to reduce the capacity of the valve, and depending upon the construction of the removable sleeve, abrupt changes to the configuration of the opening in the sleeve may produce turbulence in the fluid, particularly at the outlet of the valve which is unprotected by the removable sleeve.

In a known form of valve of the type under discussion as disclosed in my U.S. Pat. No. 4,603,834, the outlet is defined by an oblong transverse configuration immediately downstream of the downstream disk. The oblong configuration is a result of the need to provide openings to receive retainer pins which are used to anchor the downstream disk to the valve body. At times when a protective sleeve is required for the outlet chamber, the area of the oblong configuration is reduced by the thickness of the sleeve. The further reduced oblong area of the outlet, in turn, limits the maximum size of the disk that can be used in conjunction with the removable sleeve as compared with, for example, the size of the oblong outlet chamber when a removable sleeve is not used. The smaller volume for conducting fluid in the sleeve creates a larger pressure drop to the fluid passing through the sleeve, and thus reduces the capacity of the valve.

Moreover, in the known form of valves using replaceable sleeves at the outlet chamber, the sleeve is typically adhered to the valve body by an adhesive, such as epoxy cement, which also is relied upon to prevent the flow of fluid between the sleeve and the valve body. When it is necessary to replace the sleeve, the valve body must be heated to a temperature sufficient to soften the epoxy so that the sleeve can be removed. Typically, it is known to heat a valve body to over 250 degrees Fahrenheit in order to effectively soften the epoxy for replacement of the sleeve.

An inherent and historic disadvantage of such multiple orifice valves is that when the disks are subject to extreme pressures they are readily susceptible to damage and possible destruction if the fluid flow is required to be rapidly and significantly reduced such as, for example, during times of emergency. In such instances, the fluid openings in the disks are usually brought rapidly from a condition of complete alignment (full flow) to a maximum permissible degree of partial misalignment (minimum partial flow) wherein the misalignment of the fluid openings causes a sudden constriction of the fluid flow path and a corresponding increase in the already high fluid pressure exerted upon the disks. Furthermore, when operating under extremely high fluid pressures and a situation arises requiring that the fluid flow through the valve be reduced, it is imperative that the disks not be rapidly brought into a condition of complete misalignment, thereby ceasing fluid flow, since the sudden and large increase in fluid pressure creates an impulsive fluid shock force at the upstream disk which will almost certainly destroy the disks.

Consequently, valves of this nature, along with being normally characterized by physical and performance specifications including, inter alia, disk fluid opening size, maximum flow capacity and maximum operating pressure, are limited in their shut-down procedures by an inherent definitive safety parameter known as "turn-down ratio". The "turn-down ratio" of a multiple orifice valve is the ratio of full open flow area a minimum safe flow area to which the full open flow area can be rapidly yet safely reduced without causing damage to the disks and/or other elements of the valve. Once the valve has established equilibrium at minimum partial flow, it can usually then be gradually completely shut down by turning the movable disk such that its fluid opening(s) are in complete misalignment with those of the stationary disk.

In a conventional multiple orifice valve having circular shaped openings in the disks such as, for example, the valve disclosed in U.S. Pat. No. 3,207,181, or circular sector shaped openings in the disks such as in my aforementioned U.S. Pat. No. 4,603,834, the turn-down ratio is about 4:1. That is to say, the valve can be rapidly and safely turned down in a single step from 100% flow to about 25% flow without causing damage to the valve. Such a turn-down ratio may be acceptable for situations wherein up to 25% flow is permitted prior to complete shut-down of a valve such as, for example, during normal pipeline or valve maintenance. However, during emergency situations wherein it is essential to rapidly reduce and then cease flow through the valve in the shortest possible period of time, a turn-down ratio of 4:1 is unsatisfactory.

A secondary disadvantage associated with conventional multiple orifice valves having circular or circular sector shape fluid openings in the disks is that as the fluid openings between the stationary and movable disks become increasingly misaligned during a flow reduction operation, the common fluid passageway formed by the overlap of the fluid openings becomes increasingly slit-like in shape which creates a highly pressurized, knife-like and sharply angled discharge flow which can be severely erosive to valve components downstream of the disks, particularly if the fluid contains abrasive contaminants.

An advantage exists, therefore, for a multiple orifice valve construction capable of producing a high turn-down ratio and a minimally erosive discharge flow during conditions of reduced flow through the valve.

It is therefore an object of the present invention to provide a multiple orifice valve construction including a stationary disk and an abutting movable disk which is capable of producing a high turn-down ratio.

It is a further object of the invention to provide a multiple orifice valve construction including a stationary disk and a movable disk which is capable of producing a minimally erosive discharge flow during conditions of reduced flow through the valve.

It is a further object of the present invention to provide a multiple orifice valve construction which is advantageously used in the manufacture of new valves as well as in retrofitting existing valve assemblies.

Still other objects and advantages will become apparent in light of the attached drawings and written description of the invention presented hereinbelow.

SUMMARY OF THE INVENTION

To improve the turndown ratio and reduce the erosiveness of the discharge flow in a multiple orifice valve having a movable upstream disk and an abutting stationary downstream disk, particularly when the disks are subjected to high fluid pressures, the disks are provided with cooperating fluid conducting openings or orifices having a modified circular sector shape. In the preferred embodiment, the modified circular sector shape of the fluid conducting openings includes a primary opening portion formed in the general shape of a circular sector and a secondary opening portion comprising a pair of substantially semicircular supplemental openings, one of the pair of supplemental openings being provided at a radially outermost location along a first one of two radially directed walls defining the central angle of the circular sector shaped primary portion, the other of the pair of supplemental openings being provided at a similar location along the second one of the two radially directed walls. The semicircular supplemental openings, when properly aligned to an optimum turn-down position, provide a significantly increased turn-down ratio and low-erosion discharge flow exiting the downstream disk which is substantially circular in cross-section and always parallel with a central plane bisecting the fluid conducting openings of the downstream disk and passing through the common central axis of the disks.

BRIEF DESCRIPTION OF THE DRAWINGS

FIG. 2 is a side view in section of a second type of multiple orifice valve construction of the present invention also containing a movable upstream disk and an abutting stationary downstream disk each having formed therein modified circular sector shaped fluid conducting openings;

FIG. 3 is an end view of the downstream side of the downstream disk illustrated in the multiple orifice valve construction of either FIG. 1 or FIG. 2;

FIG. 4 an end view of the upstream side of the disk shown in FIG. 3;

FIG. 5 is an enlarged sectional view of the downstream disk; taken along line V—V of FIG. 4;

FIG. 6 is an end view of a pair of abutting prior art disks in a multiple orifice valve, the disks have circular fluid conducting openings and are oriented relative to one another as they would be in a turn-down position;

DESCRIPTION OF THE PREFERRED EMBODIMENTS

Figure 1:
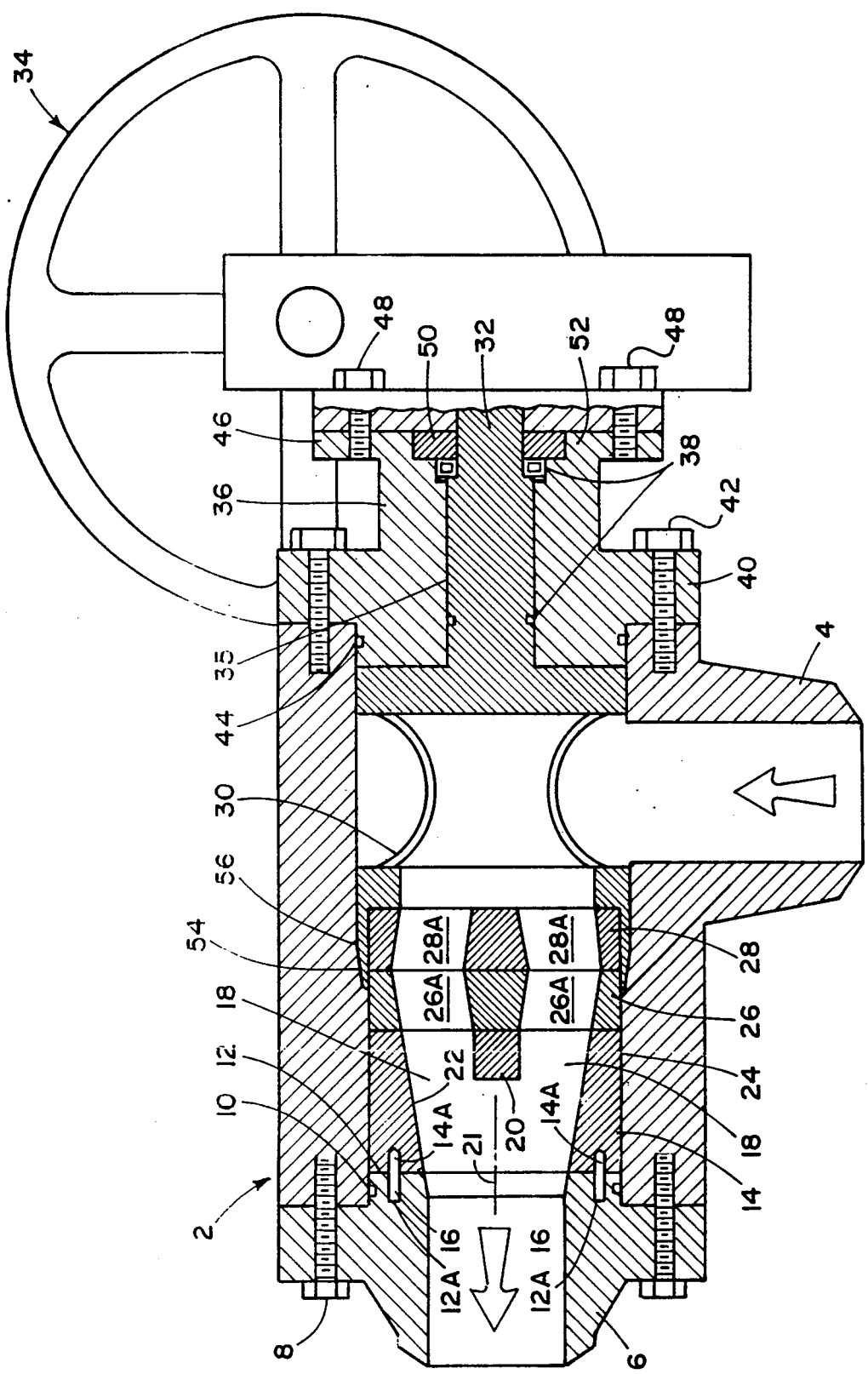
FIG. 1 is a side view partially in section of a first type of multiple orifice valve construction of the present invention containing a movable upstream disk and an abutting stationary downstream disk each having formed therein modified circular sector shaped fluid conducting openings.

In FIG. 1 there is illustrated a valve which includes a valve body 2 having an inlet portion 4 and an outlet portion 6. Outlet portion 6 is illustrated as being removably fastened to inlet portion 4 by bolts 8. However, it will be understood that any suitable means for securing outlet portion 6 to inlet portion 4, e.g., mating threading, may be used instead of bolts 8, if desired. A fluid-tight seal is formed between outlet portion 6 and inlet portion 4 by an O-ring 10. Outlet portion 6 forms an interior seat or shoulder 12 for supporting an end of a removable tubular sleeve or insert member 14. Insert member 14 is a one-piece casting preferably of stellite or stainless steel and is provided in valve 2 to protect the downstream region of the inlet portion 4 as well as the outlet portion 6 from abrasion caused by both the erosive high pressure of the fluid passing through the valve and any abrasive contaminants which may be carried by the fluid.

As depicted in FIG. 1, insert member 14 is provided with a plurality of positioning bores 14A and shoulder 12 is provided with a plurality of bores 12A which are alinable to receive positioning pins 16 therethrough. When the pins 16 are properly received in the aligned bores 12A and 14A, the insert member 14 is locked against rotation relative to the valve body 2. Although not illustrated, it is contemplated that other suitable means may be used to anchor the insert member 14 relative to the valve body. For example, one or more pins 16 may be anchored in and extend radially inwardly of the inner wall of the downstream portion of inlet portion 4 proximate to outlet portion 6. These pins could then be received in corresponding axially extending slots provided in the outer circumferntial cylindrical wall of the insert member 14. Such a construction would act as another of the many possible means to prevent rotation of the insert member 14 relative to the valve body.

At its opposite or upstream end, the insert member 14 preferably is formed with a pair of openings 18 separated by a cross-bar type support means 20, which is preferably cast integrally with insert member 14. At the downstream end of insert 14, openings 18 merge to form a single outlet opening which corresponds in diameter to the outlet opening provided in outlet portion 6 so as to prevent unwanted turbulence in the unprotected or unlined region of the outlet portion 6 of the valve body 2. The interior wall 22 of the insert 14 is generally frusto-conical in configuration tapering radially inwardly from the upstream end to the downstream end of the insert at an angle of approximately 10 relative to the outer circumferential wall 24 of the insert. Such a gradual angle of taper serves to limit turbulence in the fluid as it passes through the valve.

If present, support means 20 spans the diameter of the upstream end of the insert member 14 and forms a support member for contacting and supporting the downstream face of a downstream disk member 26 against flexure. Opposite halves of the cross-bar type support means 20 form means which protrude into the circular transverse cross section of the insert 14 and have unillustrated bores formed therein for receiving positioning pins (also not shown). The positioning pins are received at their opposite ends in similar opposed bores 26B (FIG. 3) provided in disk 26 which are alinable with the bores in insert 14 to interlock disk member 26 against rotation relative to insert member 14. Therefore, when the valve is properly assembled, the disk member 26, being locked against rotation relative to insert member 14, is also accordingly locked against rotation relative to the valve body 2. Consequently, the disk member 26 may be conveniently referred to as the stationary downstream disk. It is also possible, although not preferred, to entirely eliminate insert member 14. In such case, downstream disk 26 must be locked against rotation directly with valve body 2 by suitable means.

A rotatable upstream disk 28 is situated in face-to-face abutting contact with the upstream side of the downstream disk 26. Upstream disk 28 may be retained in a first end of a cast disk carrier 30 by a tight friction fit so as to be rotatable therewith. However, it is preferred that the upstream face of upstream disk 28 and the portion of the disk carrier 30 in contact therewith each be provided with alinable bores, similar to bores 26B, for receiving positioning pins in order to interlock the disk 28 for rotation with the disk carrier 30.

Formed on the second end of disk carrier 30 is a stem 32 preferably having a hex drive at the distal end thereof. When the stem 32 is turned by an actuator 34 operably connected thereto, the upstream disk 28 is caused to rotate relative to the downstream disk 26. Actuator 34 may either be motorized or manually operated depending on the amount of torque required to turn upstream disk 28 relative to stationary downstream disk 26. Downstream disk 26 possesses fluid conducting passageways 26A which remain in constant alignment with openings 18 in insert 14; and upstream disk 28 possesses fluid conducting passageways 28A to permit fluid to pass through the valve. The degree to which passageways 26A and 28A are aligned determines the volume of flow through the valve. The pressure of the fluid upstream of disk 28 serves to aid in retaining the disks 26, 28, the insert 14, and the shoulder 12 of outlet portion 26 in abutting relationship.

The stem 32 of the disk carrier 30 passes through a bore 35 provided in a bonnet portion 36 of valve body 2 and is sealed relative to the bonnet portion by a pair of spaced O-rings 38. Bonnet portion 36 is provided with flange 40 through which fasteners such as bolts 42 are passed in order to fasten the bonnet portion 36 to the inlet portion 4 of valve body. However, as with outlet portion 6, bonnet portion 36 may threaded into inlet portion 4, if preferred. Bonnet portion 36 is sealed with respect to inlet portion 4 by O-ring 44.

Bonnet portion 36 is further formed with a second flange 46 to which a flange of the actuator 34 may be secured as, for example, by bolts 48. With such a construction, especially when used with a relatively rigid bushing member 50 closely received within a pocket 52 formed in bonnet portion 36 and closely surrounding stem 32, the stem 32 is thereby maintained in true alignment with a central axis of the disks 26 and 28 thus reducing the shear and tension stresses on bolts 42 caused by rocking of the stem 32 within the bonnet portion 36.

Before the bonnet portion 36 is fastened to the inlet portion 4 of valve body 2 the insert 14 and disk 26 are properly aligned and positioned by their respective positioning pins. An O-ring 54 is then placed around disk 26 and is driven into a seating position by a leading rim portion 56 of disk carrier 30. In this manner the disks 26 and 28 and insert 14 are fluid sealed relative to the valve body 2. Also, assembly of the valve is simplified since the positioning bores in disk 26 may be easily aligned and registered with the positioning pins received in the positioning bores of the insert member 14 through relatively effortless rotation of disk 26 relative to insert 14. If, however, the O-ring 54 were carried with the disk 26 as it were placed in the valve body 2 and the positioning bores in disk 26 were not in proper alignment with the positioning bores in insert 14, the inherent friction between the O-ring and the valve body would require one assembling the valve to exert a significant amount of torque on disk 26 in order to properly align the interlocking bores so that the positioning pins may be properly received therein.

Turning to FIG. 2, wherein like reference characters represent similar elements, as is true in the remaining figures, there is depicted an in-line multiple orifice valve construction similar to that disclosed in my aforenoted prior United States Patent No.

In FIG. 2 there is illustrated an in-line valve which includes a valve body 2 comprising a unitary member having an inlet portion 4 and outlet portion 6. However, it is contemplated that, if desired, the valve body 2 may be formed of multiple separate body segments, such as in the FIG. 1 embodiment. In order to present still further conceivable alternatives in construction, it is possible that the cross bar type support means may be absent from the insert member 14, as is the case in FIG. 2. The valve body is provided with a reduced diameter cylindrical cavity 58 wherein fluid tight sealing is established between O-rings 60 and 62 carried by a rotor spool 64. An important feature arising out of the one-piece construction, which is particularly adaptable to in-line valve body constructions such as the valve body 2 of FIG. 2, is that rotor spool 64 can be removed from the valve body by first removing an actuator or control handle 66 and then withdrawing the rotor spool 64 through the inlet portion 4. In this way, the valve body can be manufactured more economically. Moreover, such a construction of the in-line valve allows assembly of the internal components through the inlet, thus eliminating clamping together flanges in a fluid tight manner as required when the valve body is made up of two valve body parts as is a conventional valve body. The inlet portion 4 is formed by an enlarged hub 68 having internal threads for receiving a corresponding threaded end portion of a pipe. Similarly, outlet portion 6 is formed by an enlarged hub 70, having an internally threaded portion which can receive a pipe for the discharge of fluid from the valve.

As seen in FIG. 2, the inlet 4 extends to the cylindrical cavity 58. The rotor spool 64 is positioned in the cylindrical cavity 58 and the O-ring 60 and 62 are mounted in grooves formed in the rotor spool 64 near the terminal ends thereof to form a fluid tight seal with the valve body 2 in order to prevent the passage of fluid between the rotor spool and the valve body. Fluid supplied to the valve from the inlet can pass through a passageway 72 in the rotor spool 64. In this embodiment, the passageway 72 extends in the longitudinal direction along the length of the spool. At the end of the spool which faces toward the outlet 6, the cavity 58 extends beyond the end of the spool. The rotatable disk 28 is drivingly interlocked with the rotor spool by pins 74 which extend into bores in the disk 28 and openings in the end face of rotor spool. The spool 64 can be rotated by the control handle 66, which is provided with a threaded end portion that can pass through an annular slot 76 in valve body 2, whereby the threaded end portion of handle 66 engages in a threaded opening 78 formed in the spool to retain the spool in the cylindrical cavity 58 of valve body 2. It will be observed that the slot 76 is situated along the valve body 2 between the support sites for the two O-rings 60 and 62. By rotating the spool 64 through operation of the handle 66, the spool rotates about an axis corresponding to the longitudinal axis of the cylindrically shaped rotor spool.

The rotation of the spool 64 imparts a rotary movement to the disk 28 such that, in the embodiment shown in FIG. 2, openings or fluid passageways provided in disk 28 can be moved into and out of alignment or registration with corresponding openings or passageways provided in a downstream stationary disk 26 in a manner similar to that described in the operation of the valve depicted in FIG. 1. As with the embodiment depicted in FIG. 1, the disk 26 is held in a stationary manner relative to the valve housing by anchor pins which are received at opposite ends thereof in drilled openings formed in the disk 26 and the openings formed in the replaceable sleeve or insert 14 or, when no such a sleeve 14 is not utilized, the anchor pins may be received in drilled openings provided in a ledge surface formed by a reduced step in the diameter of the opening in the outlet portion 6 of the valve body 2. The insert 14 is placed into the valve body 2 by passing the insert through the inlet opening and the cylindrical cavity 58. As in the embodiment of FIG. 1, the diameter of the outlet of insert 14 is designed to match the diameter of the unlined inner wall of the outlet portion 6 of the valve body to prevent unwanted turbulence in the unprotected or unlined outlet portion of the valve body.

As also shown in FIG. 2, in order to prevent unwanted flow of fluid between the sleeve and the valve housing, there is provided an O-ring 82, similar to O-ring 54 in FIG. 1, which is seated in a gap formed between the outer circumferential surface of disk 26 and the inner wall of the valve housing. The positioning of the O-ring is such that it is seated at the parting line between insert 14 and the valve seating surface of the housing.

Continuing with the description of FIG. 2, it can be seen that the O-ring 82 is retained in close proximity to its desired sealing site by a cylindrical extension 84 of the rotator spool 64 which is similar to the rim portion 56 of disk carrier 30 depicted in FIG. 1. The cylindrical extension 84 is provided with a relatively thin wall section having at its terminal end a thickened restraining section 86 which is an enlargement on the outside diameter of section 84. The end face of restraining section 86 is sufficiently broad to entrap the O-ring 82 and prevent unwanted displacement of the O-ring 82 away from its intended sealing site. The extension 84 of the rotor spool 64 serves further to facilitate assembly of the valve by holding the disks 28 and 26 in their confronting face-to-face relationship with the upstream disk 28 being locked by the pins 74 to the rotor spool 64. In the normal operation of the valve, the inlet pressure is higher than the outlet pressure, thus allowing fluid to flow from the inlet to the outlet and, as indicated previously, the flow is controlled by the relative positions of the openings in the disks. The O-ring 82 is held in place by friction and differential pressure urging the O-ring 82 toward the low pressure side of the valve. In the past, sudden changes in the downstream conditions for the fluid, such as a valve closing or a sudden drop in flow conditions will cause a hydraulic hammer, resulting in a momentary pressure pulse in the outlet that is higher than the fluid pressure in the inlet. This pressure pulse can be large enough, in some instances, to unseat conventional seals provided by unsupported O-rings. Once the O-ring sealing has been disrupted, the normal operation of the valve will allow a fluid flow, although small, between the disk sidewalls and the cavity formed in the valve body. The material used to form the valve body normally cannot withstand the abrasive cutting action caused by the by-pass flow of fluid and thus, irreparable damage will occur. In other instances, a deliberate back-flush of fluid is caused to occur for any one of numerous reasons. Hence, there is established flow of fluid through a valve in a reverse direction, i.e., outlet to inlet, the result is the same as the result produced by a hydraulic hammer. To correct this, the extension 84 to the rotor spool 64, as described above, avoids the unseating of the sealing O-ring 82. The restraint established by the end wall 86 can be provided by dimensioning the thin wall of section 84 to prevent rubbing or friction during adjustment of the valve for normal operation and to form a limit of travel for the O-ring 82. If a reverse flow or pressure change in the reverse direction occurs, the sealing O-ring 82 moves only as far as allowed by the restraint provided by the wall 86. The extent of movement is such that the O-ring 82 is essentially retained in place between the disk 26 and the valve body so that when normal pressure flow conditions are restored to the valve, the O-ring immediately assumes its proper sealing relationship, if it is not already in such a position. As with the construction of the disk carrier rim portion 56 described in FIG. 1, the provision of the extension 84 to the rotor spool 64 offers the further advantage that the O-ring 82, which must be wedged tightly and uniformly in place about the periphery of the disk 26, can be achieved without the need for special implements. In the past when the O-ring 82 was placed in the sealing site, it was common to wedge the O-ring through the use of a pointed blade, such as a screw driver. Using such a method, good uniform seating of the O-ring could not be assured. However, with the provision of the extension 84 to the spool 64, as with the provision of rim portion 56 of disk carrier 30 shown in FIG. 1, an automatic, continuous, uniform, and relatively effortless seating of the O-ring 82 is provided. It is to be understood, however, that the retention function of the cylindrical extension 84 of the spool 64 can be achieved by providing, for example, an extension to the valve body arranged to protrude into the opening formed in housing for receiving the disks.

In the various aforementioned embodiments of the valve body and/or insert, the pressure differential, or pressure of fluid blocked by the disks, applies a force sufficient to hold the disks in their confronting face-to-face relationship. Each of the disks 26 and 28 are formed of material which is virtually rigid such as hard metals, metal alloys, ceramics, etc. These essentially rigid disks 26 and 28 are machined or polished to an extremely high degree of surface quality, i.e., a smoothness to within approximately 2 μm RMS of a perfectly smooth surface, on at least the faces thereof which are in face-to-face contact with one another.

The most prominent advantages of providing such a high degree of surface quality on the contacting faces of the disks 26 and 28 are: 1) the rotation of the disk 28 relative to stationary disk 24 is performed in a smooth unfaltering manner, and 2) tremendous adhesion is created between the contacting faces of the disks which serves to maintain the disks in face-to-face contact and eliminates the need for providing additional sealing means to seal the perimeter of the contacting faces.

Turning to the remaining drawing figures, there is exemplified in greater detail the preferred constructions and novel advantages provided by the disk members of the present invention.

FIGS. 3 and 4 present views of the downstream and upstream faces, respectively, of the stationary downstream disk 26 shown in FIGS. 1 and 2. Although not illustrated, it will hereby be understood that movable upstream disk 28 is preferably identical in construction to downstream disk 26 and positioned in mirror-image abutting relation therewith. That is, the downstream face of the upstream disk 28 is in face-to-face confronting contact with the upstream face of the downstream disk 26.

According to the preferred embodiment of the disk assemblage of the present invention as seen in FIGS. 1 through 4 and 8, the fluid conducting openings in the disks are of a modified circular sector shape of constant size and, for reasons to be described hereinbelow, pass fluid essentially always parallel with a central plane bisecting the fluid conducting openings of the downstream disk and passing through the common central axis 21 of the disks, but which openings, in the upstream disk, diverge slightly radially outwardly relative to the central axis and, in the downstream disk, converge slightly radially inwardly relative to the central axis in mirror image to the upstream disk.

Figure 10:
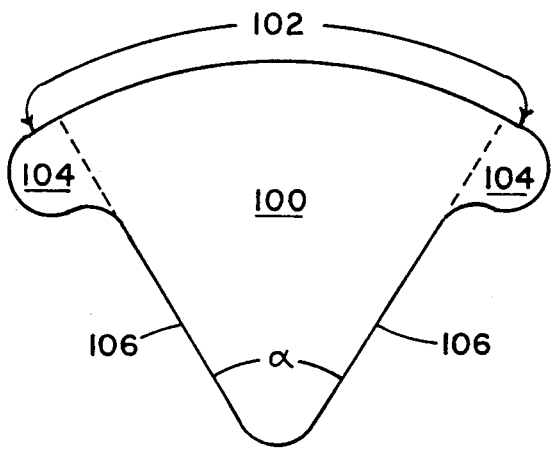
FIG. 10 is a greatly enlarged diagram illustrating the preferred cross-sectional shape of the fluid conducting openings in the upstream and downstream disks of the present invention.

A greatly enlarged depiction of this preferred fluid opening shape is shown in FIG. 10. With reference to that figure, it is seen that the preferred modified circular sector shape of the disk fluid openings of the present invention includes a primary opening portion 100 formed in the general shape of a circular sector and a secondary portion 102 comprising a least one and, preferably, a pair of supplemental openings 104. In the preferred embodiment, one of the pair of supplemental openings 104, which are preferably substantially semicircular in shape, is provided at a radially outermost location along a first one of two radially directed walls 106 defining the central angle $\alpha$ of the circular sector shaped primary opening portion 100, the other of the pair of supplemental openings 104 being provided at a similar location along the second one of the radially directed walls 106. The central angle $\alpha$ must be some value less than 90 in order to accommodate for the arc length(s) of the supplemental opening(s) 104 of secondary opening portion 102. Also, the total interior angle defined by the sum of the arc lengths of the primary opening portion 100 and the secondary opening portion 102 should be no greater than just slightly less than 90° such that the valve can be completely closed if necessary.

Figure 11:
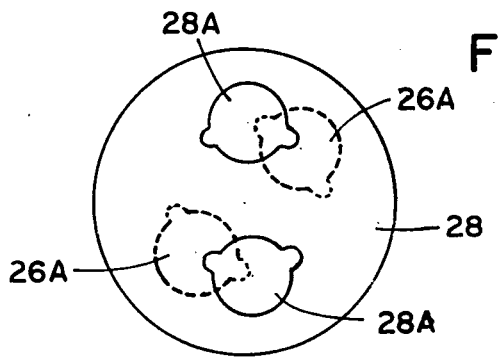
FIG. 11 is a view similar to FIG. 6 which illustrates a further embodiment of the present invention wherein the fluid conducting openings in the upstream and downstream disks may assume a modified circular shape, the upstream and downstream disks being illustrated in a not fully turned-down position.

Furthermore, although the preferred shape for the fluid openings 26A and 28A is as described supra, suitable variations in shape are conceivable. For example, the primary opening portion 100 may assume some other shape such as, for example, a circular shape, as seen in FIG. 11, rather than the circular sector shape of the preferred embodiment; one or more supplemental openings can be provided each side of the primary opening portion 100; the supplemental openings can be provided at any practical radial position along the primary opening portion, i.e., any radial position which does not affect the intended design strength of the disks nor inhibits the intended improved turn-down ratio capability which is a central feature of the present invention; or, the supplemental openings may assume shapes other than semicircular, e.g., triangular, rectangular, square, trapezoidal, semi-elliptical, circular ring sector, or the like.

Figure 7:
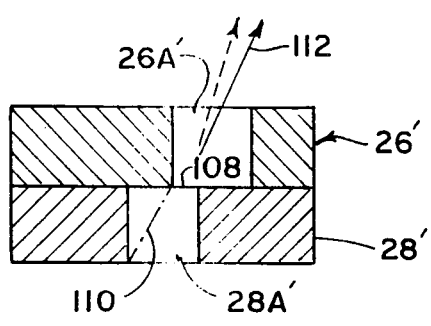
FIG. 7 is a sectional view of the abutting prior art disk taken along line VII—VII of FIG. 6 illustrating the hydraulic forces affecting the direction of fluid passing through the disks in the turn-down position.

FIGS. 6 and 7 disclose end and sectional views, respectively, of a typical prior art disk assemblage for a multiple orifice valve in a turn-down position. Although the fluid conducting openings in the disks depicted in FIGS. 6 and 7 are circular, the fluid flow conditions and associated erosion problems which they create are analogous to those which are created in other disk assemblages having different but conventional geometric fluid opening shapes, such as, for example, the circular sector or "pie-shaped" openings disclosed in my prior U.S. Pat. No. 4,603,834. This is because when such prior art disk assemblages are in a turn-down position, the overlap of their fluid openings form a "slit-like" aperture, herein designated by numeral 108, at the abutting faces of the disks having a long dimension, or length, which is at least about twice its maximum width. It is a combination of the shape of aperture 108 and the shapes of the fluid openings 26A' and 28A' from which aperture 108 is formed that deleteriously affect the maximum turn-down ratio and create the highly erosive discharge flow downstream of the downstream disk commonly present in known disk-operated multiple orifice valves.

Referring specifically to FIG. 7, it is seen that as pressurized fluid passes into fluid opening 28A' of the upstream disk 28', a portion of the fluid becomes dammed-up downstream of an imaginary plane, designated herein by the dot-dash line 110, and against the upstream face of disk 26' to form a prism-like body of relatively stationary super-pressurized fluid which acts somewhat like a solid, thereby causing the reminder of the fluid to be funneled through a space essentially bounded by the imaginary plane 110 and the portion of the wall forming fluid opening 28A' which is "upstream" of the imaginary plane 110. Thus, the fluid which passes through aperture 108 assumes the shape of the aperture and is discharged through opening 26A' in a rather severely angled direction, as designed by arrow 112, due to the major influence of the angular orientation of plane 110 which essentially acts as a "solid" fluid guiding surface. As the reader will appreciate, only the fluid flow behavior of fluid passing through the intersection of the "upper" openings 26A and 28A' of FIG. 6 is depicted in FIG. 7; the fluid flow behavior of the fluid passing through the aperture 108 of the "lower" openings will be similar except the fluid will exit "lower" opening 26A' at an angle relative to the common central axis of the disks which is equal to but in opposite direction relative to the fluid passing through the "upper" openings. Thus, the knife-like discharge flows are directed outwardly in opposite directions against the discharge outlet portion of the valve, or the tubular insert member 14 if it is present, to cause unavoidable localized erosion sites, which, if the turn-down condition or a low-flow start-up condition is maintained for any extended length of time, will become excessively eroded, thereby necessitating premature valve maintenance and/or replacement, particularly if the valve is conducting highly pressurized fluid.

Figure 8:
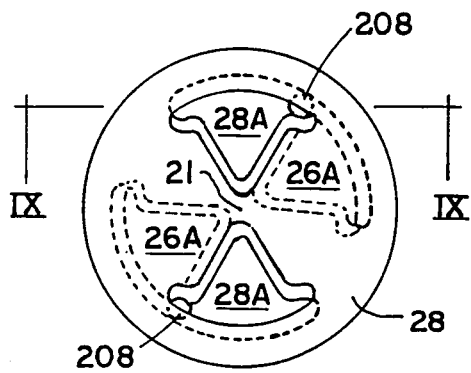
FIG. 8 is an end view of a pair of abutting disks of the present invention in a multiple orifice valve and oriented relative to another as they would be in a turn-down position.
Figure 9:
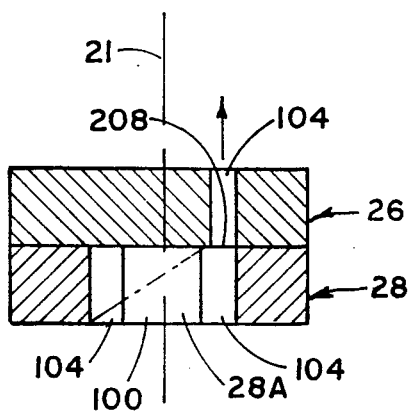
FIG. 9 is a sectional view of the abutting disks of the present invention taken along line IX—IX of FIG. 8 illustrating the hydraulic forces affecting the flow direction of fluid passing through the disks in the turn-down position.

The solution to the related problems of low turn-down ratio and localized erosion sites is solved by the novel construction of the disk members 26 and 28 of the present invention, the-flu-id conducting behaviors of which are depicted in FIGS. 8 and 9. As seen in FIG. 8, which shows the present disk assemblage in a maximum turn-down position, only the supplemental openings 104 of the secondary opening portion 102 of the disks overlap to form small apertures 208. The apertures 208 have approximately 1:1 length to width dimension ratios, and, depending upon the sizes and shapes of the openings 104, provide turn-down ratios of greater than 10:1 and as high as 20:1. That is to say, using disk members having the modified circular sector shape fluid conducting openings 26A and 28A of the present invention, it is possible to safely reduce, in one relatively rapid step, the flow of a multiple orifice valve from full flow to as low as approximately 5% of full flow.

Turning to FIG. 9, it can be seen that all of the volume fluid passing through openings 28A must first be funneled into the areas formed by the small supplemental openings 104 of the disk 28 before passing through apertures 208. Therefore, the discharge flow assumes the shapes of apertures 208 and passes essentially straight through the supplemental openings 104 of the openings 26A of the downstream disk 26. Such improved flow direction control causes discharge flows through apertures 208 to be always parallel with a central plane bisecting the fluid conducting openings of the downstream disk and passing through the common central axis 21 of the disks, thereby avoiding the localized wall/insert erosion problem commonly found common in the prior art multiple orifice valve constructions.

As noted previously, along with discharging flow parallel to the aforementioned central plane, it is also preferable that the improved fluid conducting openings according to the present invention, in the upstream disk, diverge slightly radially outwardly relative to the central axis and, in the downstream disk, converge slightly radially inwardly relative to the central axis in mirror image to the upstream disk. Such a construction finds particular benefit when the valve includes an erosion resistant sleeve such as insert member 14 lining the discharge portion of thereof. This is because such insert members commonly have an interior wall defining a fluid passageway wherein the interior wall tapers radially inwardly from the upstream end toward the downstream end of the insert. Hence, according to the present invention, the slight radially inwardly directed convergence angle of the fluid conducting openings in the downstream disk can be exactly mated with that of the interior wall of the insert member so that fluid passing from the downstream disk into the insert member flows parallel to the tapering interior wall thereof, whereby fluid turbulence, and its associated pressure drop, at the transition between the downstream disk and the insert member is virtually eliminated. As the reader will appreciate, this same beneficial effect may be realized, however, if no erosion resistant sleeve is present but the interior wall of the valve body housing immediately downstream of the downstream disk tapers radially inwardly toward the outlet of the valve.

As noted hereinabove, the shape of the primary opening portion of the fluid conducting opening 26A and 28A of the disk assemblage of the present invention may assume other configurations. In the embodiment of the invention depicted in FIG. 11, the primary opening portion is illustrated as being circular in shape. Still other shapes are conceivable. However, as will be understood from the following, the circular sector shape of the primary opening portion 100 as shown in FIG. 10 is preferred. This is because in order to maintain the structural integrity of the disks at high operating pressures, there must be no less than a minimum space "S" (FIG. 3) between the fluid openings in the disks in order to provide a sufficiently strong bridge-like support formed of disk material between the fluid openings; and, for combined long-term strength of the bridge-like support defined by minimum space "S" and optimum flow area of the fluid openings, there should also be generally linearly-increasing quantities of disk material on both lateral sides of the bridge-like support such that the disk integrity can be maintained virtually indefinitely under high pressure conditions, including maximum turn-down situations.

The modified circular sector shape of the primary portion 100 of the fluid openings 26A and 28A of the preferred embodiment of the disk assemblage of the present invention represents the largest available flow area which can provide the requisite generally linearly-increasing quantities of disk material on both lateral sides of the bridge-like support for long-term support thereof.

If, on the other hand, circular-shaped primary opening portions are provided as in FIG. 11, the initially low increase in quantities of disk material on both lateral sides of the bridge-like support necessitates that, for long-term disk strength, the minimum space "S" must be materially greater than that for the modified circular sector shaped primary opening portions of the preferred embodiment. Thus, the maximum permissible sizes of the circular openings, if employed, are limited by the need to provide a greater minimum space "S" between the openings. Therefore, in order to assure long-term disk integrity, the areas of the circular openings will necessarily have to be reduced and their flow capacities will be less than those of circular sector shaped configurations.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. A valve having an improved turn-down ratio and low-erosion discharge flow, the valve including the combination of:
   a valve body having an internal cavity with an inlet and outlet for fluid;
   an upstream disk rotatably supported in the cavity of said valve body and having two openings for conducting fluids;
   means for rotating said upstream disk;
   a stationary downstream disk arranged in a face-to-face and confronting relation with said upstream disk in the cavity of said valve body, said downstream disk having two openings for conducting fluid from the fluid conducting openings in said upstream disk said upstream and downstream disks having a common central axis extending perpendicular to end faces of the disks;
   each of said fluid conducting openings in said upstream disk and said fluid conducting openings in said downstream disk comprising a circular sector shaped primary opening portion and a secondary openings portion the secondary opening portion including two substantially semicircular supplemental openings, a first one of said supplemental openings being located at a radially outermost position along a first of two radially directed walls defining a central angle of the circular sector shaped primary openings portion and a second one of said supplemental openings being located at a radially outermost position along a second of said two radially directed walls the secondary openings portion of the fluid conducting openings of the upstream disk when the fluid conducting openings of the upstream disk are brought into a turn-down position with respect to the fluid conducting openings of the downstream disk, aligns with the secondary opening portion of the fluid conducting openings of the downstream disk to permit discharge flow from the downstream disk which is essentially always parallel with a plane bisecting the fluid conducting openings of the downstream disk and passing through the common central axis of the disks.

2. The valve of claim 1 wherein the secondary opening portion of each of said fluid conducting openings includes at least one supplemental opening.

3. The valve of claim 2 wherein the secondary opening portion of each of said fluid conducting openings includes two supplemental openings.

4. The valve of claim 2 wherein the primary opening portion of each of said fluid conducting openings is essentially circular sector shaped.

5. The valve of claim 1 wherein each of said supplemental openings is substantially semicircular in shape.

6. The valve of claim 1 wherein alignment of the secondary opening portion of the fluid conducting openings of the upstream disk with the secondary opening portion of the fluid conducting openings of the downstream disk results in a turn-down ratio for the valve of at least about 10:1.

7. The valve of claim 1 wherein the fluid conducting openings in said downstream disk converge slightly radially inwardly toward the common central axis of the disks.

8. The valve of claim 7 wherein the fluid conducting openings in said upstream disk diverge slightly radially outwardly from the common central axis of the disks.

9. The valve of claim 7 further comprising a tubular insert supported in said valve body and having a fluid passageway, said tubular insert being interlocked with said downstream disk and with said valve body, said tubular insert serving to conduct fluid from the fluid openings in the downstream disk to said outlet, said tubular insert having a frusto-conical interior wall converging radially inwardly from a first end thereof toward a second end thereof; said fluid conducting openings in said downstream disk and said interior wall of said tubular insert converging at substantially the same angle whereby fluid turbulence is virtually eliminated at a transition between the downstream disk and the tubular insert.

* * * * *